(No Model.)
A. B. HENDRYX.
FISHING REEL.
No. 459,581. Patented Sept. 15, 1891.
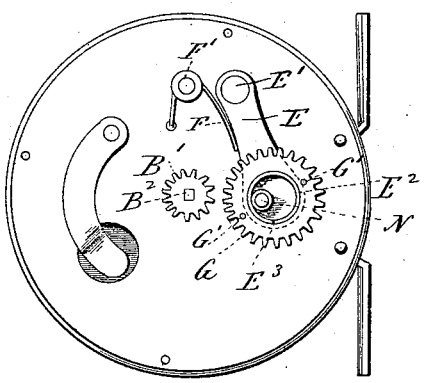
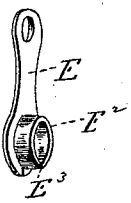
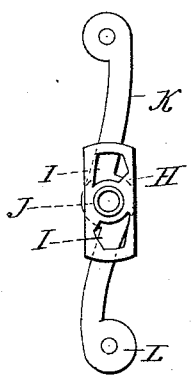
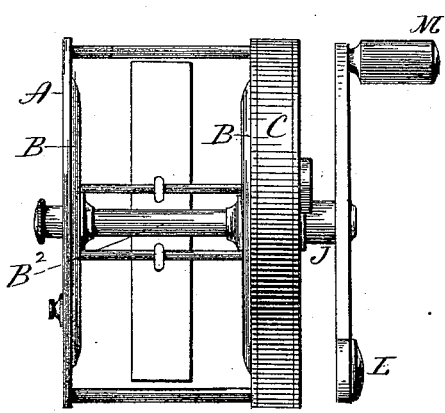

UNITED STATES PATENT OFFICE.

ANDREW B. HENDRYX, OF NEW HAVEN, CONNECTICUT.

FISHING-REEL.

SPECIFICATION forming part of Letters Patent No. 459,581, dated September 15, 1891.

Application filed March 27, 1891. Serial No. 386,604. (No model.)

*To all whom it may concern:*

Be it known that I, ANDREW B. HENDRYX, of New Haven, in the county of New Haven and State of Connecticut, have invented a new Improvement in Fishing-Reels; and I do hereby declare the following, when taken in connection with accompanying drawings and the letters of reference marked thereon, to be a full, clear, and exact description of the same, and which said drawings constitute part of this specification, and represent, in—

Figure 1, a view in side elevation of a reel constructed in accordance with my invention; Fig. 2, a view thereof in end elevation, with the handle-lever and cap removed to show my improved features; Fig. 3, a detached perspective view of the pivotal arm, and Fig. 4 a similar view of the hollow pinion. Fig. 5 is a detached reverse plan view of the handle-lever and the clutch.

My invention relates to an improvement in reels for fishing-rods, the object being to simplify and cheapen their construction and to make them more durable and reliable in use.

With these ends in view my invention consists in the combination, with a reel-frame, of a spool having a pinion fixed to one end of its shaft, a spring-actuated pivotal arm provided at its free end with a split tubular bearing, a hollow pinion frictionally mounted on the said bearing and normally held out of engagement with the fixed pinion by the spring actuating the said arm, and a handle-lever mounted independently of the said arm on a bearing concentric with the center of the hollow pinion when the same is meshed with the fixed pinion and loosely connected with the said hollow pinion, which it moves up to the fixed pinion when turned in one direction.

My invention further consists in certain details of construction, as will be hereinafter described, and pointed out in the claims.

The frame A, the spool B, having a small pinion B′ attached to one end of its shaft B², the cap C, and the handle-lever D may be of any approved construction. An arm E, pivotally secured to the inner plate of the frame by a pivot E′, is provided at its free end with a tubular bearing E², standing at a right angle with it and slit so as to make it elastic, as at E³, the said slit being carried down through the extreme end of the arm. A spring F, secured to the plate by a pin F′, has one of its ends engaged with the arm E in such a manner as to exert a constant effort to throw the same away from the fixed pinion B′, before mentioned. A hollow pinion G is mounted upon the split bearing E², before mentioned, the said bearing being slightly compressed to receive it, so that the pinion is normally held against rotation by the friction developed in the effort of the split bearing to spring open. The said hollow pinion is provided upon its outer face with two pins G′ G′, located opposite each other and respectively engaged by the opposite ends of a two-armed clutch, which, as herein shown, consists of a flat oblong plate H, provided in each end with an opening I, having inclined walls and rigidly secured to the lower end of the sleeve J of the handle-lever K, one end of the said lever being provided with a weight L and the other with a handle M, and the said sleeve being mounted upon a bearing-pin N, projecting from the inner plate of the reel-frame and mounted therein so as to be concentric with the center of the hollow pinion when the same is in mesh with the fixed pinion. I do not, however, limit myself to any particular mode of mounting the handle-lever or to any one form of clutch for connecting the lever with the hollow pinion. It will be apparent that when the handle-lever is turned away from the person using the reel the clutch will co-operate with the pins on the hollow pinion to overcome the tension of the spring F and swing the pivotal arm inward and bring the hollow pinion into position to mesh with the fixed pinion, whereby the spool is temporarily geared to the handle, which will thereafter positively rotate it until the handle is released, when the action of the spring F, actuating the pivotal arm, will at once move the arm outward, and hence disengage the hollow pinion from the fixed pinion. The friction developed between the split bearing E² and the hollow pinion couples the same and the bearing together and gives the clutch of the handle-lever a hold for moving the hollow pinion up to the fixed pinion. The expansion of the said bearing completely compensates for wear between the same and the pinion, the said construction being at the same time very simple and strong and not liable to derangement and consisting of few parts, so that it may be readily taken apart and put together again.

I do not broadly claim the combination, with a fishing-reel, of a pivotal arm carrying a pinion adapted to be thrown into gearing with a pinion on the spool-shaft by means of the handle-lever on the reel; but, Having fully described my invention, what I claim as new, and desire to secure by Letters Patent, is—

1. In a fishing-reel, the combination, with the reel-frame, of a spool having a pinion fixed to one end of its shaft, a spring-actuated pivotal arm provided at its free end with a split tubular bearing, a hollow pinion frictionally mounted on the said bearing and normally held out of engagement with the fixed pinion by the spring actuating the said arm, a handle-lever mounted independently of the said arm on a bearing concentric with the center of the hollow pinion when the same is meshed with the fixed pinion, and a clutch carried by the said handle-lever and connected with the said hollow pinion for moving the same up to the fixed pinion when the handle is turned in the right direction for winding the spool, substantially as described, the friction between the split bearing and the hollow pinion coupling them together and giving the clutch of the handle-lever a hold for moving the hollow pinion up to the fixed pinion.

2. In a fishing-reel, the combination, with a reel-frame, of a spool having a pinion fixed to one end of its shaft, a spring-actuated pivotal arm provided at its free end with a tubular bearing, a hollow pinion frictionally mounted on the said bearing and normally held out of engagement with the fixed pinion by the spring actuating the said arm and having two pins mounted at opposite points in its upper face, a bearing-pin mounted in the reel-frame in position to be concentric with the center of the hollow pinion when the same is in mesh with the fixed pinion, a handle-lever provided with a sleeve fitting over the said bearing-pin, and a two-armed clutch attached to the said sleeve in position to be engaged with the pins mounted in the hollow pinion, substantially as set forth, and whereby when the handle-lever is turned in right direction for winding the spool the clutch will co-operate with the hollow pinion to move the same into engagement with the fixed pinion, the friction between the split bearing and the hollow pinion coupling them together and giving the clutch of the handle-lever a hold for moving the hollow pinion up to the fixed pinion.

In testimony whereof I have signed this specification in the presence of two subscribing witnesses.

ANDREW B. HENDRYX.

Witnesses:
EDWARD N. PECK,
HARRY E. HENDRYX.